US005771230A

United States Patent [19]

Stoeckl et al.

[11] Patent Number: 5,771,230
[45] Date of Patent: Jun. 23, 1998

[54] METHOD FOR REALIZING LOGICAL COMMUNICATIONS PARTNERS IN COMMUNICATIONS SYSTEMS

[75] Inventors: Werner Stoeckl, Baierbrunn; Michael Tietsch, Kaufering, both of Germany

[73] Assignee: Siemens Aktiengesellschaft, Munich, Germany

[21] Appl. No.: 655,967

[22] Filed: May 31, 1996

[30] Foreign Application Priority Data

May 31, 1995 [EP] European Pat. Off. ............. 95108384

[51] Int. Cl.$^6$ ..................................................... H04L 12/56
[52] U.S. Cl. .......................................... 370/395; 370/397
[58] Field of Search .................................... 370/389, 391, 370/392, 393, 395, 396, 398, 399, 368, 397, 409, 428; 379/93–98, 93.14, 242, 245

[56] References Cited

U.S. PATENT DOCUMENTS 5,568,482  10/1996  Li et al. .................................. 370/395
5,606,559  2/1997  Badger et al. .......................... 370/395

FOREIGN PATENT DOCUMENTS

WO 94/05121  3/1994  WIPO .

OTHER PUBLICATIONS

Computer Networks and ISDN Systems, vol. 27, No. 1, Oct. 1994, International Standardization of B–ISDN, J.B. Kim et al, pp. 5–27.

Supercomm/ICC '94, sponsored by IEEE Communications Society, May 1–5, 1994, An Object–Oriented Interface for a Distributed Connection Manager, P. Mouchtaris et al, pp. 273–277.

IEEE Globecom '94, IEEE Communications Society, Nov. 28–Dec. 2, 1994, Relation Between Call Control and Resource Control in B–ISDN, X. Hou et al, pp. 639–643.

*Primary Examiner*—Dang Ton
*Attorney, Agent, or Firm*—Hill & Simpson

[57] ABSTRACT

Logical access segments (ACC) related to communications terminals are installed and managed for each communications partner (KP) in A database (DB) of a communications system (KS), in particular an ATM communications system. An identification (ID) and information (vci, vpi, wi, tri, qi) representing physical resources (R) of the respective communications partner (KP), as well as allocated switching-oriented possibilities (s) is entered into each access segment (ACC). During a connection setup by a communications partner (KP), the information (vcpi, vci) representing the requested physical resources (R) is taken from the allocated logical access segment (ACC) and allocated to further segments (LUP, LCP, LINK) for the duration of the connection. Through the use of the logical access segments (ACC) in a switching procedure structure (CPS) of a communications system (KS), a separation of the switching procedures from the management and setting of the physical resources (R) related to the communications terminals is achieved. As a result a switching procedure structure (CPS) can be designed independently of the physical instances of a communications system (KS).

20 Claims, 4 Drawing Sheets

FIG. 6

METHOD FOR REALIZING LOGICAL COMMUNICATIONS PARTNERS IN COMMUNICATIONS SYSTEMS

BACKGROUND OF THE INVENTION

In communications systems, in particular public or private switching apparatus, switching procedure structures or, respectively, switching program structures are provided in which the essential switching-oriented functions (that is, the switching-oriented control of a communications connection between at least two communications partners, in particular communications terminal devices, connected to communications terminals of the switching apparatus) are realized with the incorporation of the information concerning the circuit-oriented or, respectively, physical construction of the communications terminals. In communications systems, communications partners may be communications terminal devices of subscribers, as well as other switching apparatus or gateway apparatus. The information concerning the circuit-oriented or, respectively, physical construction of the communications terminals are required for the formation of setting information during the calculation of the essential switching-oriented settings (that is, the settings that control communications connections) of the circuit-oriented components, in particular of a coupling field and of the communications terminal circuits, and are thus to be transmitted to the switching program structure, to be stored and evaluated, that is, processed, there.

A switching procedure structure is already known from WO 94/05 121 (corresponding to U.S. Ser. No. 392,727, nationalized Feb. 24, 1996, in which a high degree of independence of the physical setting of the switching-oriented resources, in particular the coupling field, from the connection control, that is, the call processing, is provided. The independence is essentially achieved by means of a division of the switching procedure structure into a physical and a logical switching subprogram module, whereby the physical resources, that is, the coupling field, are physically set on the basis of the logical setting information transmitted from the logical to the physical switching subprogram module. The physical resources of a communications partner, to which for example parts of a communications terminal or even several communications terminals of a switching apparatus are allocated, are hereby combined for the switching apparatus in "access managers" and directly allocated to the switching program structure. By means of this division, with regard to the setting of the coupling field an independence is achieved for the controlling of the connection. However, an independence with regard to the management of the physical resources of the communications partners connected to a switching apparatus or, respectively, their communications apparatus, is not provided. This means that during a physical or procedural modification of the physical resources of a communications partner connected to the switching apparatus, that is, during a configuring, there must be carried out not only modifications in the administrative and O & M (operating and maintenance programs or, respectively, memories, but also substantial adaptations in the switching program structure.

Furthermore, switching program structures of this type cannot be used for communications apparatus or, respectively, communications terminal devices (for example, for narrow-band and broadband or multimedia communications apparatus) that can be connected to communications systems and that are physically and procedurally very different, due to the substantially higher amount of information to be processed.

SUMMARY OF THE INVENTION

It is an object of the present invention to provide a switching apparatus having a switching program structure that is largely independent of the configuration of the most various physical resources of the connected communications partners, with as economic a realization as possible.

In general terms the present invention is a method for realizing a switching procedure structure which is independent of the instance of the physical resources of a communications partner connected to a communications system. By means of the switching procedure structure a connection controlling is effected between at least two communications partners, to which respectively at least a part of the physical resources of at least one communications terminal is allocated. A logical access segment is installed and managed in the database of the communications system for each communications partner. Each logical access segment has an identification identifying the respective communications partner and at least one terminal overview related respectively to a communications terminal. Also, in a terminal overview resource information indicating the physical resources of the communications terminal allocated to the respective communications partner, as well as switching information indicating the switching-oriented possibility thereof are entered.

An important aspect of the inventive method is that by means of access segments arranged and managed in the database of a communications system, a management unit is created in which all physical resources of a communications partner are contained, by which means an extensive separation of the procedural switching-oriented functions and of the management of the configuration of the physical resources of the connected communications partners is achieved. The procedural switching-oriented functions having abstracted descriptions of the communications partners, that is, connection segments provided with a respective identification and with information of the access segments, can thereby be realized. This means that the procedural switching-oriented software is separate from the physical communications terminal software, that is, the software related to the circuit engineering. By means of this separation, procedural switching program structures can be realized that are largely independent of the physical and procedural characteristics of the communications terminals allocated to the communications partners, and are thus usable for considerably different instances of the physical resources of the communications partners. Furthermore, configurations in the communications system have no effect on the procedural switching procedure structure, that is, no modification is required. Only the access segment is to be updated once, in the context of a configuring of the communications system.

In addition, the separation enables a realization of the procedural switching-oriented functions at an abstracted level, whereby a considerable reduction of the information to be transmitted, stored and evaluated is effected. This means on the one hand a faster calculation of the switching-oriented setting information, as well as, a reduction of the scope of the program of the switching program structure.

According to the invention, each access segment has an identification that identifies the communications partner, and at least one terminal overview, related to a respective communications terminal. In a terminal overview resource information is entered that indicates the physical resources of the communications terminal allocated to the respective communications partner, as well as a switching information indicating the switching-oriented possibility thereof.

Preferably, the access segments in the database are installed and managed by ATM communications systems operating in asynchronous transfer mode. In ATM communications systems, parts of the physical resources of a communications terminal are often allocated to the communications partners due to the considerable scope of the physical resources of a communications terminal, for example, 155 Mbit/s. For broadband communications partners, for example, a further switching apparatus, the physical resources of several communications terminals can be allocated to a communications partner. Since within an ATM communications system the flow of information, for example, between a control apparatus realizing the switching procedure structure and a switching apparatus realizing the physical through-connection, is substantially reduced using the inventive method, the inventive method is used in particular for control and switching apparatus that are realized separately.

In communications systems operating according to the asynchronous transfer mode, resource information related to communications terminals is provided that is advantageously represented by a connection path information indicating the number of virtual connection paths, as well as a channel information indicating the number of virtual channels in a virtual connection path, a value information indicating the value range of the virtual connection paths and channels, a transfer information indicating the maximum transfer speed for the respective communications terminal, a table indicating the allocation of the virtual path information to the virtual connection path information, and a quality information indicating the transmission or service class. By means of these entered information, the physical resources allocated to a communications partner within a communications terminal are clearly defined, whereby in a switching-oriented setting message concerning the communications terminal, which message effects the physical through-connection in the context of a connection setup for a communications connection, only the corresponding access segment, that is, the one provided with the corresponding identifying mark, is to be indicated.

The switching-oriented possibilities allocated to the physical resources are advantageously defined in an access segment through entering of a signaling information indicating the possibility of signaling, and, if a signaling is possible, of a signaling type information indicating the signaling type, as well as of a scope information indicating the number of simultaneously possible signaling and useful connections. Through this information, it is communicated to the switching procedure structure whether, and via which of the allocated physical resources of a communications terminal, a signaling procedure will be processed. For switched connections, a signaling procedure is provided. For fixed lines, no signaling procedure is provided. If no signaling procedure is provided, no switching function, and thus no further processing in the switching procedure structure, is required. If a signaling procedure is indicated by an entry of a corresponding information, the corresponding function is activated in the switching procedure structure through the indication of the type of signaling protocol (for example, a subscriber signaling protocol at a terminal of communications apparatus operating in asynchronous transfer mode), that is, a switching program structure realizing this signaling protocol is activated. Through the scope information, the number of simultaneous signaling and useful connections is indicated to the switching procedure structure, that is, the maximum dynamic and static switching-oriented load is indicated. The switching procedure structure and the switching-oriented resources are to be prepared for the indicated loads. The information representing the switching-oriented possibilities is advantageously allocated respectively to the channel information representing the one virtual channel, by which means the virtual channel determined by the channel information is determined as the signaling channel. This means that in this signaling channel only signaling information or signaling information and useful information is transmitted.

According to a further development of the inventive method, the information representing the requested physical resources is taken from the allocated access segment in dependence on the physical resources requested by the communications partner in the context of a connection setup. The information is entered into a logical terminal subsegment provided with an identification and is managed there for the duration of the connection. Through this allocation, the physical resources are matched to a current connection with a currently requested transfer rate, current number of channels and/or paths. Hereby information representing resources required for the current connection is taken from the allocated access segments for the duration of a connection and is no longer available for other connections, for example, virtual connections.

For a physically independent connection control in the switching procedure structure, several logical terminal subsegments are allocated to a connection segment and managed for the duration of a connection, whereby a connection segment represents the physical resources for a bidirectional subconnection up to a through-connection point. This means that for a bidirectional connection between two communications apparatus, two connection segments are formed and managed, whereby two bidirectionally operating connection elements are switched through the switching procedure structure. By means of this separation, procedural switching program structures are realizable that are largely independent of the physical and procedural characteristics of the communications terminals and of the communications apparatus or, respectively, the communications terminal devices.

For a disturbance-free application of the inventive method, it is a precondition that the access segments in the database are installed or updated after each configuring of the communications system by means of O & M messages, whereby the O & M messages are formed under the control of an operator apparatus or in a self-sufficient fashion through an access segment routine. In smaller communications systems, the formation of the O & M messages required for this purpose advantageously takes place under the control of the operator apparatus, and in larger communications systems, a self-sufficient formation of the O & M messages, controlled by an access segment routine, is advantageous.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
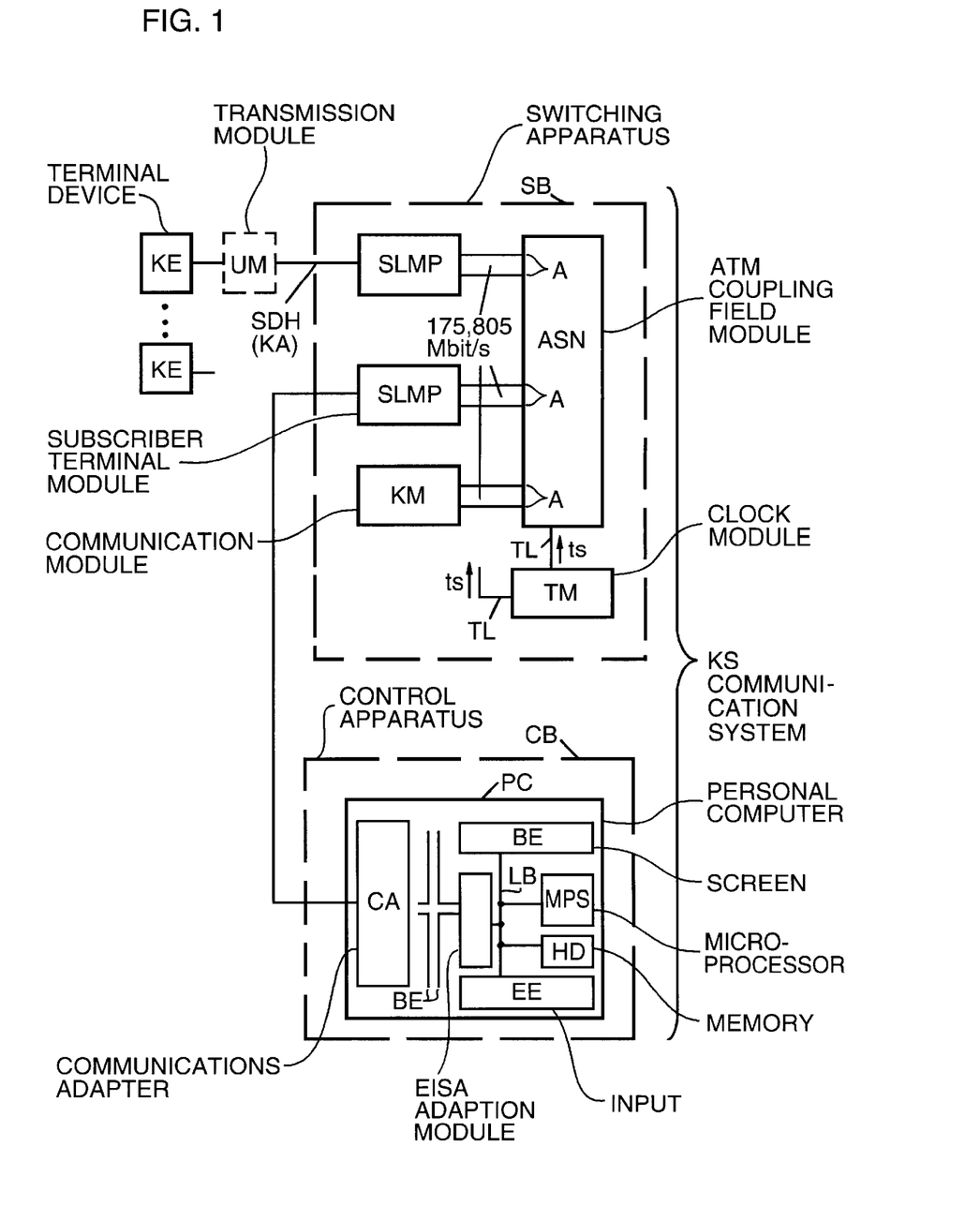
FIG. 1 depicts the circuit-oriented structure of an ATM communications system.

FIG. 1 shows a communications system KS realizing the inventive method, formed by a switching apparatus SB and a control apparatus CB.

In the switching apparatus SB are arranged an ATM coupling field module ASN that operates according to the asynchronous transfer mode, several subscriber terminal modules SLMP, a communications module KM and a clock module TM.

The ATM coupling field module ASN is for example designed with sixteen bidirectional terminals A, each with a transmission speed of 175,805 Mbit/s. For the switching of cells formed according to the asynchronous transfer mode, these are switched corresponding to the transmitted switchingoriented information concerning the ATM coupling field module ASN, according to the self-switching principle. This means that cells are switched in a self-sufficient manner via the coupling field module ASN, by means of the transmitted switching-oriented information (for example, in a prefixed additional cell header). The information is physically transmitted in an NRZ (non-return to zero)-coded manner to each of the sixteen terminals A of the processor-controlled ATM coupling field module ASN by means of differential shifted ECL (emitter coupled logic) signals. The ATM coupling field module ASN is for example realized according to the coupling field disclosed in EP 0 329 005 B1.

A subscriber terminal module SLMP or a communications module KM can be connected to each of the sixteen terminals A, whereby a communications module KM is provided in a switching apparatus SB. In FIG. 1, two connectable subscriber terminal modules SLIMP are shown as examples for the maximum of fifteen.

In the clock module TM, clock signals ts, required for the operation of the ATM coupling field module ASN, of the subscriber terminal modules SLMP and of the communications module KM are formed and transmitted to the respective components of the switching apparatus SB via separate clock lines TL. In particular, these clock signals ts are provided for the operation of the microprocessors installed in the components SLMP, ASN, KM of the switching apparatus SB and for the transmission of the information concerning the interfaces corresponding to the switching apparatus.

For the connection of communications terminal devices KE operating according to the asynchronous transfer mode, the subscriber connection modules SLMP are equipped with an SDH (synchronous digital hierarchy) interface SDH, with a transmission speed of 155 Mbit/s. The transmission of data or, respectively, information via the SDH interface SDH is carried out according to the CCITT recommendation I.121 (user network interface UNI) in the synchronous transfer mode (STM-1), with a transmission speed of 155.52 Mbit/s.

Transmission modules UM are indicated by means of a rectangle shown in broken lines and inserted between the communications terminal device KE and the subscriber connection module SLMP. Remote communications terminal devices KE are connected to the switching apparatus SB by means of these transmission modules UM. The transmission modules UM contain transmission-oriented apparatus (not shown) for an electrical transmission of the cell-oriented information via coaxial cable according to the CCITT recommendation G.703 or for an optical transmission via light waveguide according to the CCITT recommendations G.957/958.

Broadband communications terminal devices KE of this type for connection to the switching apparatus SB can be realized by a plurality of apparatus. Examples include connections to further ATM communications systems KS, adapters for the connection of local networks, ISDN switching apparatus (for example, to the HICOM switching system) and ATM workstations.

The cells to be transmitted from or to the control apparatus CB are controlled by means of the communications module KM. For this purpose, a layer 2 function, corresponding to the ISO layer model, and a layer 3 function, provided for the switching of the cells within the switching unit SB, are realized in the communications module KM. Furthermore, the communications module KM comprises a switching-oriented subfunction, by means of which switching-oriented, administrative and O & M messages transmitted from the control apparatus CB and vice versa are transformed, by means of the inventive method, into messages conformed to the switching apparatus, that is, related to the physical construction of the switching apparatus SB.

For the communication of the switching apparatus SB with the control apparatus CB, the latter is equipped with a communications adapter CA. The communications adapter CA is arranged in a personal computer PC that realizes the control apparatus CB. The personal computer PC, realized by a commercially available personal computer, has in a known fashion a screen apparatus BE, an input apparatus EE, mass memory apparatus HD (for example, hard disks) and a microprocessor system MPS. In addition, an adaptation module EISA that realizes an EISA bus BEI is integrated into the personal computer PC, whereby the communications adapter CA is connected to the EISA bus BEI. The components BE, EE, MPS, HD, EISA of the personal computer communicate via an internal local bus LB. The EISA bus is a bus decoupled from the internal local bus LB, having a bit width of 32 bits and a transfer rate of 33 Mbyte/s.

Figure 2:
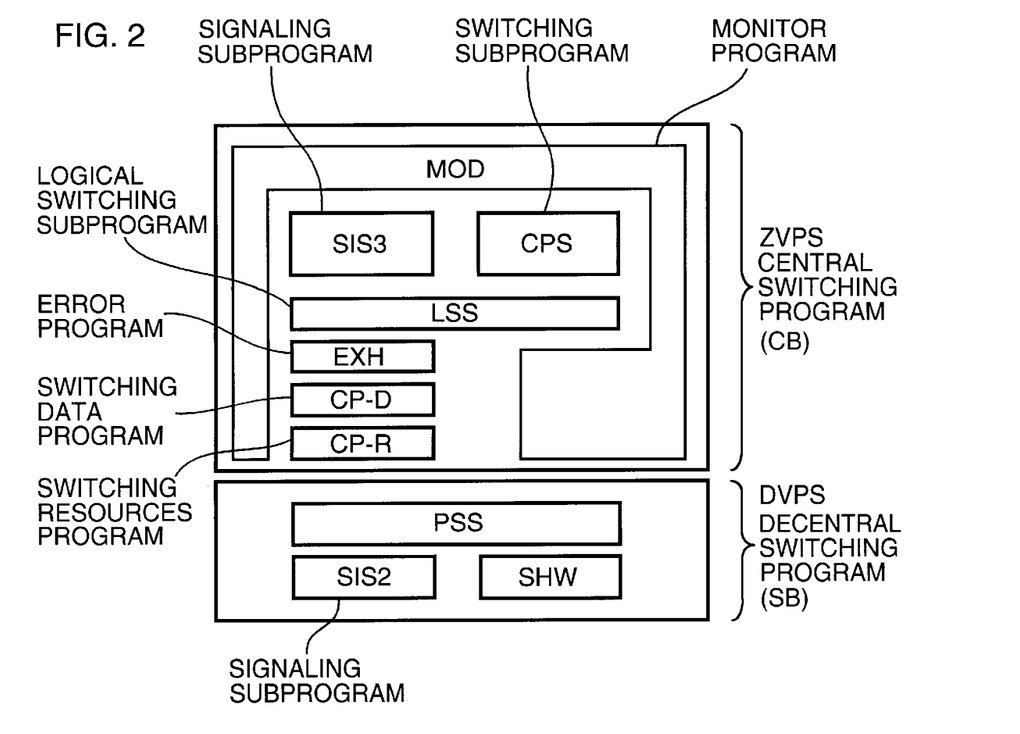
FIG. 2 depicts the switching program structure in an ATM communications system according to FIG. 1.

FIG. 2 shows a switching procedure structure VPS or, respectively, a switching program structure VPS, realized in the communications system KS according to FIG. 1, divided into a central switching program structure ZVPS implemented in the control apparatus CB and a decentral switching program structure DVPS implemented in the switching apparatus SB. The central switching program structure ZVPS is stored in the program memory of the personal computer PC representing the control apparatus. The decentral switching program structure DVPS is essentially stored in the program memory of the communications module KM arranged in the switching apparatus SB.

The central switching program structure ZVPS is formed by a monitor program module MOD, a signaling subprogram module SIS3, a switching subprogram module CPS, a logical switching subprogram module LSS, a switching data program module CP-D, a switching resources program module CP-R and an error program module EXH. In the decentral switching program structure DVPS there is provided a physical switching subprogram module PSS, a further signaling subprogram module SIS2 and a hardware program module SHW.

The external software interfaces of the central switching program structure ZVPS to for example, O & M and security-oriented program structures (not shown) are realized by means of the monitor program module MOD. These are message-oriented interfaces.

A transport control function and a level 3 function are contained in the signaling subprogram module SIS3. Hereby the layer 2 connections are controlled by the transport controlling function (in the ISO 7-layer model, layer 2 represents the connection-oriented security layer, for example, HDLC connections). The following tasks are allocated to the transport controlling function:

Processing of events for setting up and tearing down layer 2 connections, which are required for the transport of layer 3 messages.

Multiplexing of several switching-oriented connections in a layer 2 connection, and their management.

Transfer of the information from the security layer (layer 2) to the switching layer (layer 3) and vice versa.

Processing of error messages within the security layer.

The layer 3 function represents the switching-oriented layer, whereby a protocol program module is implemented in this layer that realizes an ATM signaling protocol according to the standard "UNI Specification Draft 3.1" of the ATM Forum of 1993. This protocol program module represents the interface between the switching-oriented program modules and the security layer, whereby the information to be transmitted and the state control are processed according to the ATM signaling protocol. The signaling program module can be realized in two protocol variants. In one protocol variant, the control apparatus CB can be used as control apparatus CB of the communications system KS, and in the other protocol variant it can be used as a communications terminal device.

In the switching subprogram module CPS, a corresponding image is available for each component of the ATM communications system KS involved in a connection. The components are the communications partner, the device and the inventive access segment.

The communications partner, or also subscriber, controls the connection setup and tearing down, as well as the request of performance features, by his information transmitted within a signaling procedure. His signaling number or, respectively, dialing number and his authorizations for services, performance features, etc., represent the user, and these parameters are imaged in the switching subprogram module CPS in a user segment for the duration of a connection, that is, read from a segment of a database and stored in the user segment.

The device represents the same apparatus via which a communications partner communicates with the communications system KS. An apparatus of this sort can be represented by a communications terminal device, a transition apparatus to other networks, for example, to local networks or another communications system, for example, a further ATM communications system or an ISDN communications system. The parameters required for the specification are imaged in a device segment for the duration of a connection.

In the error program module EXH, error messages that appear in the central switching program structure CPS are collected and transmitted via the monitor program module MOD to security-oriented program structures (not shown).

Figure 3:
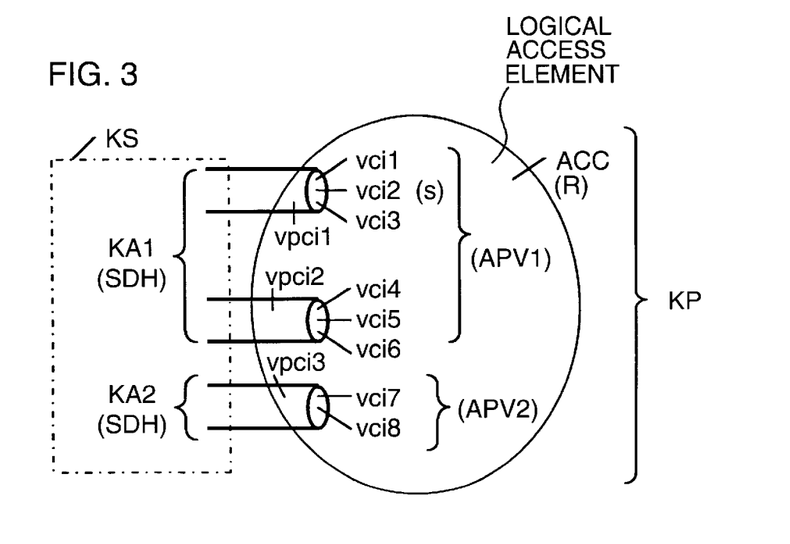
FIG. 3 depicts the allocation of the physical resources to a logical access segment representing a communications partner.

FIG. 3 shows the communications system KS according to FIG. 1, indicated by broken lines. Let it be assumed for the exemplary embodiment that two communications terminals KA1,2 are allocated to a communications partner KP, whereby the communications partner KP is for example realized by means of a further ATM communications system (not shown). The communications terminals KA1,2 correspond respectively to the SDH interfaces SDH explained in FIG. 1, each having a transmission speed of 155.52 Mbit/s. To each (in the exemplary embodiment, to the represented communications partner KP) a logical access element ACC is inventively allocated, into which the physical resources R of the communications partner KP are entered and managed. Furthermore, a terminal overview APV (in the exemplary embodiment, two terminal overviews APV1,2) is allocated in the logical access segment ACC for each communications terminal KA allocated to a communications partner KP. Each of the terminal overviews APV1,2 is for example realized by means of a table, in which information relating to ATM communications terminals concerning the physical resources R are entered.

In the exemplary embodiment, two connection path information vpci1,2 are allocated to the first terminal overview, and a third connection path information vpci3 is allocated to the second terminal overview APV2. By means of these connection path information vpci1. . . 3, connection paths (not shown) definable according to ATM terminal technique are represented, in which respectively one or several virtual channels (also not shown) are combined. The virtual channels allocated to a virtual path are indicated in the logical access segment ACC by means of channel information vci. In the exemplary embodiment, three channel information vci1. . . 3 are allocated to the first connection path information vpci2, three channel information are likewise allocated to the second connection path information vpci2, and two channel information vci7,8 are allocated to the third connection path information vpci, whereby each channel information vci1. . . 8 represents a virtual channel in the respective virtual path. In dependence on the physical resources R allocated to one communications partner KP, one or several terminal overviews APV can be inventively provided for a logical access segment (ACC), and various pluralities of connection path information and channel information vpci, vci can be allocated to these.

As an example, an information s indicating the switching-oriented possibility is allocated to the second channel information vci. This information s is formed through a signaling type information sai, indicating the signaling type, and through a scope information ui, indicating the number of simultaneous signaling connections and useful connections—see FIG. 4. The type of signaling, for example, ATM subscriber signaling in switched operation, is indicated by means of the signaling type information sai. In the communications system KS, a corresponding procedure or, respectively, a corresponding signaling program is to be implemented in order to effect the indicated signaling with the communications partners KP or, respectively, their communications terminal devices. The maximum dynamic and static loading is indicated to the communications system KS by means of the number of maximum simultaneous signaling or, respectively, useful signal connections. The communications system KS supplies the dynamic (processor power) and static loading (switching-oriented resources) corresponding to the indicated scope information ui, if the communications partner KP applies for these during a connection setup.

Figure 4:
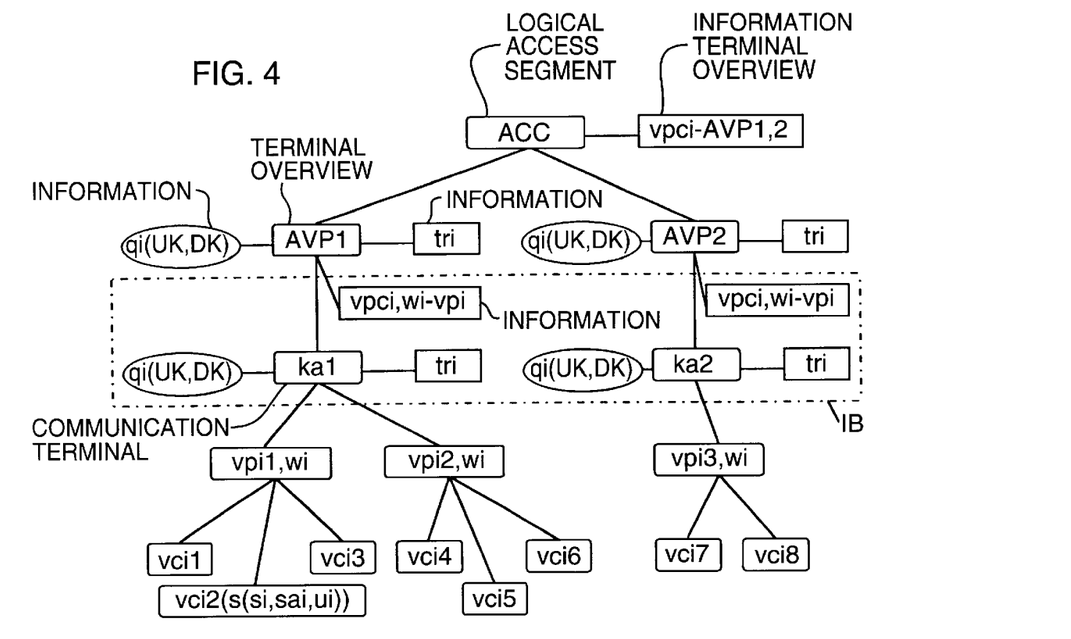
FIG. 4 depicts the structure of a logical access segment according to the allocation in FIG. 3.

In FIG. 4, the structure of the logical access segment ACC shown in FIG. 3 is shown on the basis of an object model. The allocations and the functions of the represented information vpci, vci, s, sai, ui are already explained in the embodiments for FIG. 3. Value information wi are respectively allocated to the virtual connection path information vpci. The value ranges allocated to the connection path and channel information vpci, ki, in particular numerical value ranges, are indicated by means of these value information wi. In addition, in FIG. 4 quality information qi as well as transfer information tri are allocated to the terminal overviews APV1,2. The quality information qi are for example, represented by means of a transmission or service class UK, DK, whereby the quality of the corresponding service or of the transmission (which contains for example, a maximum allowable bit or packet error rate) is indicated by means of the service or transmission class UK, DK. The transfer information tri indicates the maximum allowable cell transfer speed with which a communications partner KP may transmit cells, that is, packets of defined length, via the respective communications terminal KA. The indication is made for example, in cells per second. Furthermore, a table is allocated to each terminal overview APV1,2, in which table the conversion of the connection path information vpci into path information vpi ensues. This conversion is required because the connection path information vpci is used as logical information during a connection setup in a subsequently explained segment, and the path information vpi relates to the physical, virtual path of an ATM communications terminal KA. The communications path information vpci is advantageously matched to the logical processing in the switching procedure. Analogously to this, in the logical access segment ACC a table is provided, by means of which the allocation of the connection path information vpci to the terminal overview APV1,2 is indicated. By means of this allocation, a purposeful inquiry of the physical resources R is possible in a virtual path of a communications terminal KA.

By means of the information ka1, ka2, which concern communications terminals, the allocation of the terminal overview AVP1,2 to the communications terminals KA is indicated. This allocation, as well as the quality and transfer information qi, tri again allocated hereto, are indicated during the installation of a logical segment, but however are no longer taken into account in the context of a further connection controlling. The allocation of the connection path information vpci to the path information vpi is likewise no longer taken into account. The logical access segment ACC thus presents itself during the operation, that is, in the context of a connection controlling, without the information or, respectively, tables surrounded by broken lines.

In the exemplary embodiment, a first and second path information vpi1,2 are allocated to the information ka1 that represents the first communications terminal KA1, and a third path information vpi3 is allocated to the information ka2 representing the second communications terminal KA2. Corresponding to FIG. 3, a first, second and third channel information vci1, vci2, vci3 are allocated to the first path information vpi1, a fourth, fifth and sixth channel information vci4, vci5, vci6 are allocated to the second path information vpi2, and a seventh and eighth channel information vci7, vci8 are allocated to the third path information vpi3.

For the identification of a logical access segment ACC during the integration into a connection controlling or, respectively, into the switching-oriented processes, an identification ID, for example, an identification number idn, is entered into the access segment ACC.

Figure 5:
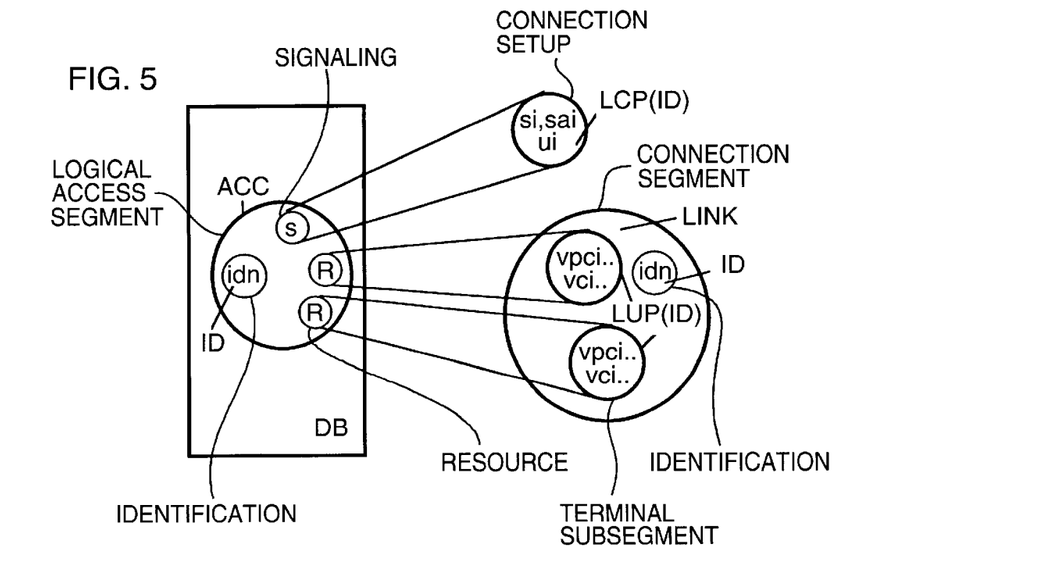
FIG. 5 depicts an access and connection segment setup.

In an inventive access segment ACC shown in FIG. 5, transfer and quality information tri, qi are represented (as is explained in FIG. 3 and FIG. 4) by means of O & M messages, by means of connection path and channel information vpi. . ., vci. . ., including the value information wi, entered in terminal overviews APV1,2, and are generally indicated in FIG. 5 by circles designated R. The switching-oriented possibilities s (in particular with respect to the signaling procedures in the logical channels) are indicated by a circle designated s. The requested switching-oriented resources R are taken and allocated to a terminal subsegment LUP for the duration of a connection (indicated in FIG. 5 by circles designated LUP with insertions vpci. . ., vci. . . ) in dependence on the requests transmitted by a communications apparatus KE of the communications partner KP regarding transfer rate and number of virtual channels and paths for a desired connection in the context of a connection setup. Analogously to this, the switching-oriented possibilities s of the allocated access segment ACC are allocated to a logical signaling subsegment LCP for the duration of a connection in the context of a connection setup (indicated in FIG. 5 by a circle designated LCP with insertions sai, ui). For a resource-independent realization of a switching subprogram module CPS, several logical terminal subsegments LUP are allocated to a connection segment LINK for the duration of a connection.

During a connection setup, the information vpci . . . , vci representing the requested physical resources R are taken from the access segment ACC allocated to the respective communications partner KP in a manner corresponding to the switching-oriented information (usually originating address and target address or the port number) transmitted by a communications partner KP, and corresponding to the partially or completely requested physical resources R (for example, transfer rate and number of virtual channels and paths), and are allocated to one or more logical terminal subsegments LUP for the duration of a communications relation or, respectively, a connection (fixed line or switched connection). Here the logical terminal subsegments LUP are combined to connection segments LINK provided with an identification ID (for example, an identification information idn); see FIG. 5. A connection segment LINK, including an identification ID, thus represents logically the entirety of the physical, communications terminal-related characteristics or, respectively, resources requested during a connection setup by a communications partner KP. The connection control takes the information concerning the physical resources R of a communications partner KD from this connection segment LINK allocated for the duration of a connection, or stores information of this type in this segment.

Furthermore, during a connection setup the information sai, ui representing the switching-oriented possibilities s concerning the signaling are taken from the incorporated access element ACC, and are allocated to a logical signaling subsegment LCP for the duration of a connection. The allocation into a logical terminal subsegment LUP is carried out in the physical switching subprogram module PSS, and the allocation to connection segments LINK is carried out in the logical switching subprogram module LSS.

Figure 6:
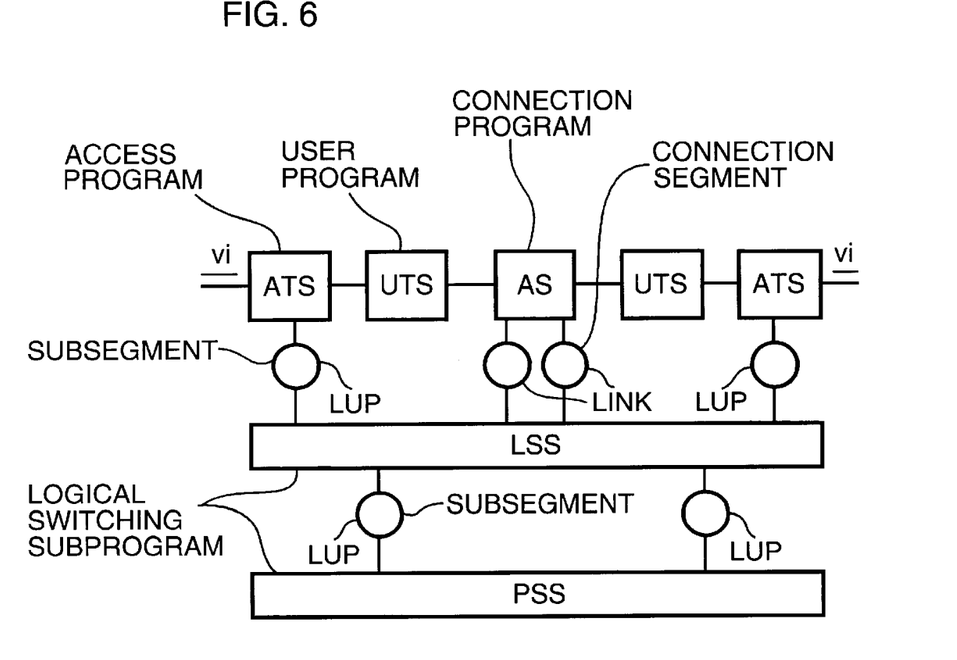
FIG. 6 depicts a program module structure for a connection between two communications apparatus.

FIG. 6 shows a program module structure, implemented in the switching subprogram module CPS, for a connection between two communications partners KP or, respectively, their communications terminal devices KE. Here, on the basis of the information vpci. . ., vci . . . contained in the logical terminal subsegments LUP and representing the physical resources R, access program modules ATS execute all functions relating to the parameters of a connection (for example, virtual channel and path number as well as the maximum cell transmission rate) that are to be taken into account by the communications system KS during the setup and tearing down, or, respectively, during modifications, of connections. A new connection can be accepted only if sufficient switching-oriented resources are available, in particular at the communications terminal SDH and in the ATM coupling field module ASN. This monitoring is carried out together with the switching resources program module CP-R.

Within the switching subprogram module CPS, a user program module UTS represents the communications partner KP or, respectively, the subscriber with his characteristics and authorizations. The user is identified by his dialing number or, respectively, his subscriber number.

The connection program module AS is responsible for the through-connection and clearing down of a connection between two communications partners KP or, respectively, subscribers. For this purpose, the connection program module AS makes use of the user and access program modules ATS, UTS for the calling and for the called party. By means of the four program modules ATS, UTS, the connection program module AS is informed about the respective state of the connection setup from both sides, and subsequently the through-connection or, respectively, the clearing down of the bidirectional connection is carried out at the proper point in time.

In the logical switching subprogram module LSS shown in FIG. 2, the physical resources or, respectively, characteristics of the ATM useful channels (not the signaling channels) are abstracted to logical terminal points in the connection segments LINK formed for the duration of a connection. With the connection segments LINK managed by the logical switching subprogram module LSS, the switching subprogram module CPS can realize the switching-oriented functions independently of the physical characteristics defined in the connection segments LINK (indicated in FIG. 6 by circles between the logical switching subprogram module LSS and the user program modules ATS, as well as the connection program module AS). The switching subprogram module LSS essentially serves for the decoupling of the procedural switching function from the circuit-oriented one.

The switching-oriented message traffic between the control apparatus and the switching apparatus SB, CB is brought about predominantly through terminal subsegments LUP inserted into messages (indicated in FIG. 6 by the corresponding circles between the logical and the physical switching subprogram modules LSS, PSS).

In the central switching program structure ZVPS, the required data are held in persistent static and dynamic objects. Data of the persistent objects are data that are stored on the basis of O & M messages in the communications system KS and must be maintained in any case across a restart. These are in particular data that are stored in the access and user segments ACC, including associated data such as identification information idn. Data of the static objects are data that are derived from the persistent data after a new start or restart of the communications system KS. These are for example data concerning the current state of available switching-oriented resources, as well as concerning access segments ACC and their characteristics. The dynamic data contain information about resources R related to connection program modules, states and combination information.

By means of the physical switching subprogram module PSS implemented in the switching apparatus SB, the switching-oriented messages transmitted by the control apparatus CB are converted into hardware-proximate switching oriented messages and transmitted to the corresponding components of the switching apparatus SB. Here the physical switching subprogram module PSS receives information from the logical switching subprogram module LSS only through the transmission of logical terminal subsegments LUP, for example, as to which terminal of the ATM coupling field module ASN is to be connected with which. The physical path selected through the ATM coupling field module ASN is managed by the physical switching subprogram module PSS (including the resources internal to the ATM coupling field module). By this means, the procedural switching technique is almost independent of the physical characteristics of the communications terminals and can thus be used separately for the most various physical instances of the communications system. Furthermore, by this means a largely hardware-independent development and maintenance of switching-oriented programs is enabled.

The inventive method can be used to particular advantage not only in ATM communications systems KS, but also in ISDN communications systems having a "narrow-band switching procedure structure" (for example, 64 or n×64 Kbit/s). Here a terminal overview APV is for example allocated to an ISDN communications terminal, realizing an SO-ISDN interface, of an ISDN communications system.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for realizing a switching procedure structure which is independent of current physical resources of a communications partner connected to a communications system, the switching procedure structure effecting a connection controlling between at least two communications partners to which respectively at least a part of physical resources of at least one communications terminal is allocated, comprising the steps of:

installing a logical access segment and managing the logical access segment in a database of the communications system for each communications partner;

providing for each logical access segment an identification identifying a respective communications partner and at least one terminal overview related respectively to a communications terminal; and entering in a terminal overview, resource information indicating the physical resources of the communications terminal allocated to the respective communications partner, and switching information indicating a switching-oriented possibility thereof.

2. The method according to claim 1, wherein the logical access segments installed for each communications partner in the database are installed and managed by ATM communications systems operating in asynchronous transfer mode.

3. The method according to claim 1, wherein in communications systems operating according to asynchronous transfer mode, the resource information is represented by:

connection path information indicating the number of virtual connection paths, as well as channel information indicating the number of virtual channels in a virtual connection path;

value information indicating a value range of the virtual connection paths and channels;

transfer information indicating a maximum transfer speed for the respective communications terminal;

a table indicating allocation of the virtual path information to the virtual connection path information; and quality information indicating one of a transmission class and a service class.

4. The method according to claim 1 wherein the switching-oriented possibilities allocated to the physical resources are defined in a logical access segment through entering of signaling information indicating possibility of signaling, and wherein, if a signaling is possible, signaling type information indicating a signaling type, and scope information indicating a number of simultaneously possible signaling and useful connections.

5. The method according to claim 4, wherein information representing the switching-oriented possibilities is respectively allocated to channel information representing a virtual channel, by which a virtual channel determined by the channel information is determined as a signaling channel.

6. The method according to claim 1, wherein the information representing requested physical resources is taken from an allocated access segment in dependence on the physical resources requested by the communications partner in the context of a connection setup, and are entered into a logical terminal subsegment provided with an identification, and are managed there for a duration of the connection.

7. The method according to claim 1, wherein in a connection setup for a communications partner, information representing the switching-oriented possibilities, which is allocated to information representing the requested physical resources, is taken from the allocated logical access segment and is entered into a logical signaling subsegment provided with an identification and is managed there for a duration of a connection.

8. The method according to claim 6, wherein, for a physically independent connection control in the switching procedure structure, in this structure several logical terminal subsegments are allocated to a connection segment and are managed for a duration of a connection, a connection segment representing the physical resources for a bidirectional subconnection up to a through-connection point.

9. The method according to claim 6, wherein, within the switching procedure structure:

switching paths are calculated in a switching subprogram module on the basis of formed connection segments, and switching-oriented setting information is formed through indication of connection segments to be connected;

the connection segments are formed and managed in a logical switching subprogram module, and terminal subsegments are transmitted from and to the logical switching subprogram, and switching-oriented messages are transmitted to and from a physical switching subprogram module; and in the physical switching subprogram module, the terminal subsegments are formed and managed by the access segments, and, corresponding to the switching-oriented messages, setting information that effect the physical through-connection is formed by the access segments.

10. The method according to claim 1, wherein the access segments in the database are installed or updated after each configuring of the communications system by means of operating and maintenance messages, whereby operating and maintenance messages being formed under the control of an operator or in a self-sufficient fashion through an access segment routine.

11. A method for realizing a switching procedure structure which is independent of current physical resources of a communications partner connected to a communications system operating according to asynchronous transfer mode, the switching procedure structure effecting a connection controlling between at least two communications partners to which respectively at least a part of physical resources of at least one communications terminal is allocated, comprising the steps of:

installing a logical access segment and managing the logical access segment in a database of the communications system for each communications partner;

providing for each logical access segment an identification identifying a respective communications partner and at least one terminal overview related respectively to a communications terminal; and entering in a terminal overview, resource information indicating the physical resources of the communications terminal allocated to the respective communications partner, and switching information indicating the switching-oriented possibility thereof, said resource information being represented by connection path information indicating a number of virtual connection paths, as well as channel information indicating a number of virtual channels in a virtual connection path, value information indicating a value range of the virtual connection paths and channels, transfer information indicating a maximum transfer speed for the respective communications terminal, a table indicating allocation of virtual path information to the virtual connection path information, and quality information indicating one of a transmission class and a service class.

12. The method according to claim 11, wherein the logical access segments in the database are installed and managed by ATM communications systems operating in asynchronous transfer mode.

13. The method according to claim 11, wherein the switching-oriented possibilities allocated to the physical resources are defined in a logical access segment through entering of signaling information indicating possibility of signaling, and wherein, if a signaling is possible, signaling type information indicating a signaling type, and scope information indicating a number of simultaneously possible signaling and useful connections.

14. The method according to claim 13, wherein information representing the switching-oriented possibilities is respectively allocated to channel information representing a virtual channel, by which a virtual channel determined by the channel information is determined as a signaling channel.

15. The method according to claim 13, wherein the information representing requested physical resources is taken from an allocated access segment in dependence on the physical resources requested by the communications partner in the context of a connection setup, and are entered into a logical terminal subsegment provided with an identification, and are managed there for a duration of the connection.

16. The method according to claim 13, wherein in a connection setup for a communications partner, information representing the switching-oriented possibilities, which is allocated to information representing the requested physical resources, is taken from the allocated logical access segment and is entered into a logical signaling subsegment provided with an identification and is managed there for a duration of a connection.

17. A method for realizing a switching procedure structure which is independent of current physical resources of a communications partner connected to a communications system, the switching procedure structure effecting a connection controlling between at least two communications partners to which respectively at least a part of physical resources of at least one communications terminal is allocated, comprising the steps of:

installing a logical access segment and managing the logical access segment in a database of the communications system for each communications partner;

providing for each logical access segment an identification identifying a respective communications partner and at least one terminal overview related respectively to a communications terminal; and     entering in a terminal overview, resource information indicating the physical resources of the communications terminal allocated to the respective communications partner, and switching information indicating switching-oriented possibility thereof, said switching-oriented possibilities allocated to the physical resources being defined in a logical access segment through entering of signaling information indicating possibility of signaling, and, if a signaling is possible, signaling type information indicating a signaling type, and scope information indicating a number of simultaneously possible signaling and useful connections.

18. The method according to claim 17, wherein information representing the switching-oriented possibilities is respectively allocated to channel information representing a virtual channel, by which a virtual channel determined by the channel information is determined as signaling channel.

19. The method according to claim 17, wherein the information representing requested physical resources is taken from an allocated access segment in dependence on the physical resources requested by the communications partner in the context of a connection setup, and are entered into a logical terminal subsegment provided with an identification, and are managed there for a duration of the connection.

20. The method according to claim 17, wherein in a connection setup for a communications partner, information representing the switching-oriented possibilities, which is allocated to the information representing the requested physical resources, is taken from the allocated logical access segment and is entered into a logical signaling subsegment provided with an identification and is managed there for a duration of a connection.

* * * * *